UNITED STATES PATENT OFFICE 2,570,651

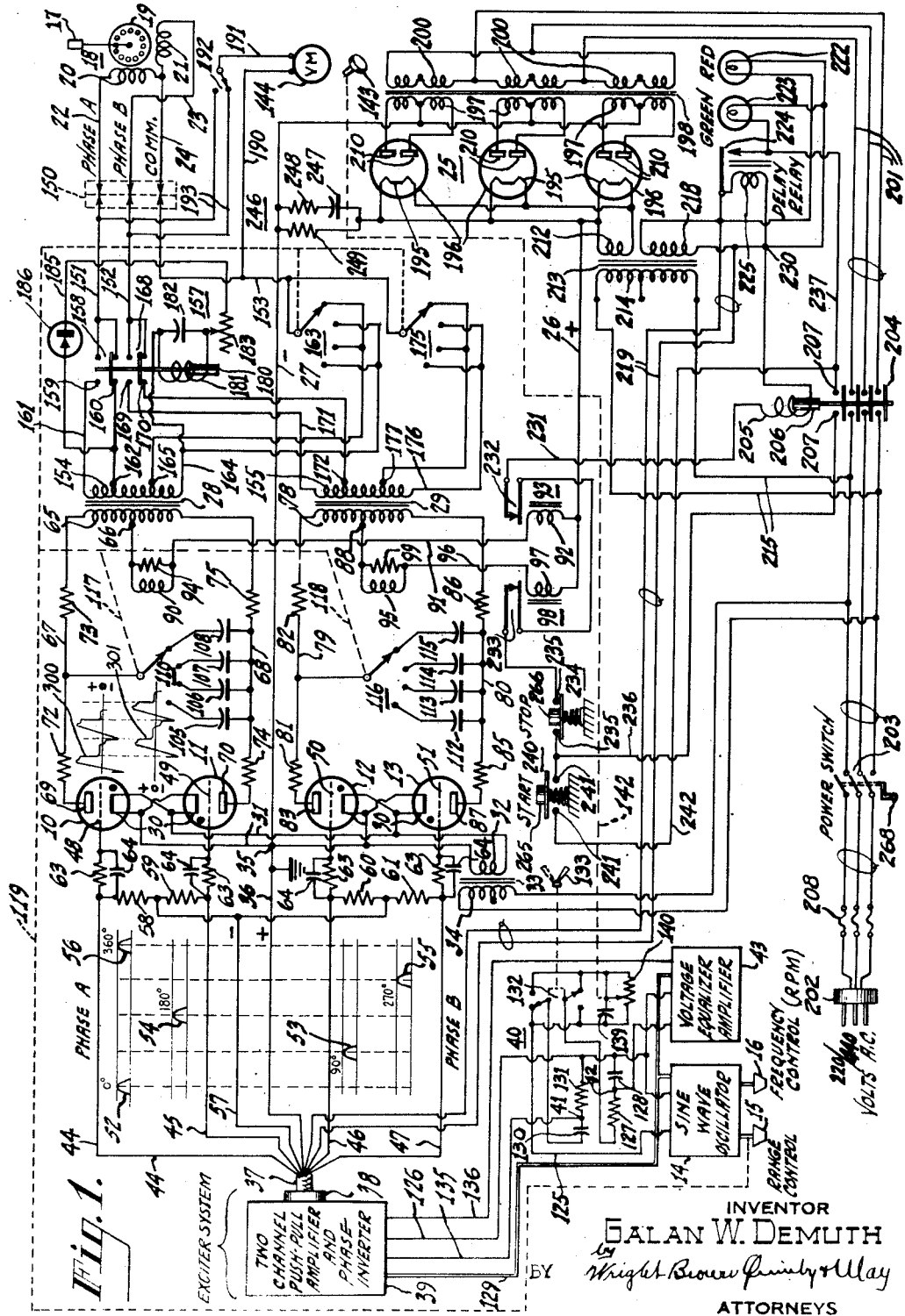

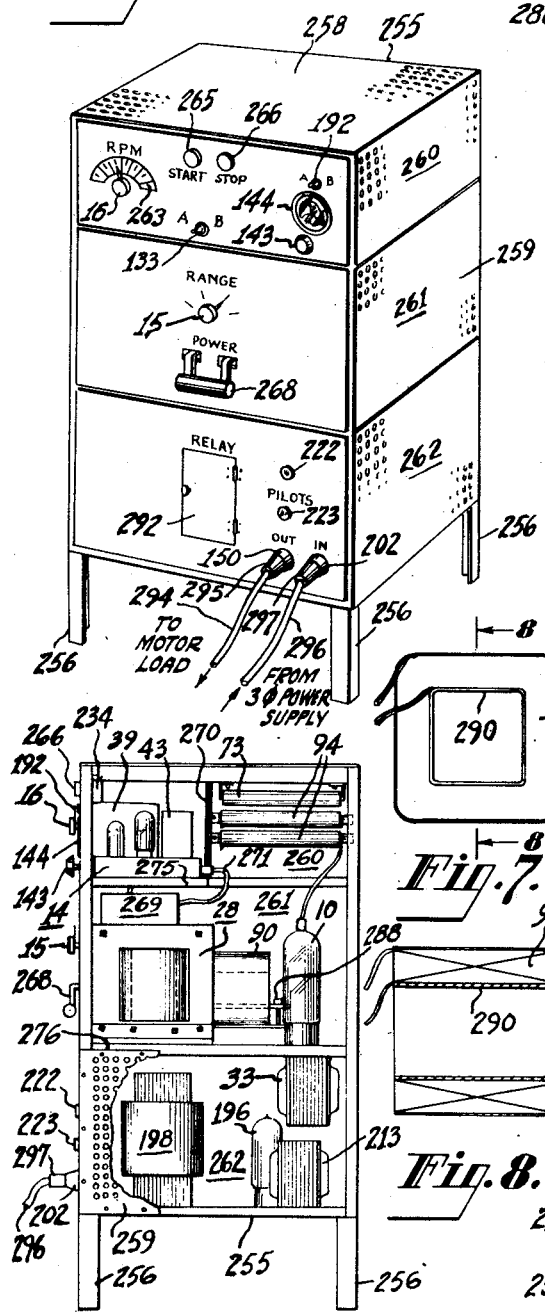

THYRATRON POWER INVERTER

Galan W. Demuth, Moorestown, N. J., assignor to Bryant Chucking Grinder Company, Springfield, Vt., a corporation of Vermont Application October 15, 1949, Serial No. 121,604

24 Claims. (Cl. 318—231)

The present invention relates to thyratron inverters for converting direct current power into alternating current power at a controlled frequency, and has for its primary object to provide an improved thyratron inverter power supply system for high-speed industrial electric motors and the like, which is adapted for high frequency operation with maximum efficiency.

It is also an object of the invention, to provide a thyratron power inverter which is adapted for use in controlled electronic high-frequency power supply systems for alternating current high-speed industrial electric motor, under various conditions of load and frequency adjustment.

A thyratron inverter in accordance with the invention, is particularly adapted for use in a variable frequency power supply system for high-speed induction motors and the like when provided with excitation means, as shown, described and claimed in a copending application of Galan W. Demuth, Serial No. 115,526, filed September 13, 1949, now Patent No. 2,548,955, for Exciter Systems for Thyratron Power Inverters and the Like, and assigned to the same assignee as this application.

In the system referred to, an improved variable frequency exciter or control system is provided for generating two-phase excitation voltages or pulses for the full-wave or parallel operation of a pair of thyratron inverters. The system is readily adjustable over a wide frequency range without variation in the output voltage of either phase, and operates to maintain an output wave form for each of the two phases which is of a pulse shape and of a polarity suitable for controlling or exciting thyratron power inverter circuits with maximum efficiency and at relatively high frequencies.

While the thyratron power inverter system of the present invention is particularly adapted for use in connection with a high frequency exciter system of the type above referred to, it may be operated in connection with any suitable source of high-frequency excitation which provides for alternately firing a pair of thyratrons or electronic grid-controlled gaseous-discharge type tubes in push-pull or parallel relation, and which further provides for two-phase operation with two inverters of the type referred to, for supplying balanced power to two-phase high-speed induction motors and the like loads.

Except for some experimental hydrogen thyratron inverters operated at extremely high voltages, known thyratron inverter systems generally operate at low frequencies, such as 60 cycles per second, for power output of any appreciable magnitude, and have frequency range limitations which prevent variable frequency and high speed control of alternating current motors of the induction type, for example, for high-speed grinding and woodworking operations, requiring tool speeds ranging up to 100,000 revolutions per minute, and higher. Rotary converter, motor-generator and other rotating power supply means for variable frequency and high-speed motor control, likewise have certain limitations at the higher speeds.

It is, therefore, a further object of this invention to provide an improved high frequency electronic or thyratron power inverter which is operative with a high degree of stability in frequency ranges relatively higher than the practical operating ranges of available electronic and rotary power supply means, whereby controlled high frequency alternating current power may be provided in a practical and economical manner for industrial motor applications requiring relatively high operating speeds.

An efficient high frequency power supply system of the electronic-tube type has been sought by the machine tool industry and by the woodworking industry, for example, to provide efficient high-speed motor drive for various tools and tool elements, such as grinding wheels, cutters and the like, and to attain certain required high working speeds with direct connection between the driving motor and the driven tool element.

In a practical form of power transmitting means between a motor and a high speed tool spindle, the motor and work spindles are joined directly, thereby requiring higher motor speeds than have commonly been the practice. For high speed direct drives, the alternating current induction motor is considered to be best as a power source, because of a lack of any commutating difficulties and design complications, including the problem of unbalance at the high speeds involved, which are inherent with other forms of electric motor means.

For high speed direct drive of tool spindles in machine tools, woodworking machinery and the like, the squirrel cage induction motor is at present preferred for use in connection with a power supply system embodying the invention, as it is adapted for rugged design and is provided with a rotor which makes high speed direct drive possible, both from mechanical as well as electrical considerations. The rotor may be considered practically as a simple shaft element, as it includes only a few conductor bars which may be brazed or welded in place, and the whole rotating element may thus be designed for good static and dynamic balance and for less wind resistance at high speeds.

Considering a two-pole induction motor, a speed of thirty-six thousand revolutions per minute may be obtained with a power supply ferquency of six hundred cycles. With the demand for high tool spindle speeds, power at higher supply frequencies is required, and in the machine tool industry, for example, present speed requirements for small grinding wheels may include speeds of the order of nineteen thousand revolutions per minute for a one-inch diameter wheel, whereas with a one-eighth inch diameter wheel, for efficient operation, speeds well above one hundred fifty thousand revolutions per minute must be obtained at the wheel spindle.

With a direct connected induction motor having two poles, this makes the power supply problem difficult, since a considerable amount of power must be provided at the high frequency required, and it is often found desirable that this frequency be variable over a wide range to adjust the spindle speed in accordance with the diameter of the particular grinding or cutting tool attached thereto, and the other requirements of the work load. It will be seen that a required supply frequency for powering such tool and like spindles may thus exceed three thousand cycles per second, and when the supply of such power by electronic means, such as thyratron inverters, has heretofore been considered, the rapid excitation and deionization requirements have presented some of the many formidable obstacles in the way of any practical design for use by the industry heretofore.

It is, therefore, a further and important object of this invention, to provide an improved thyratron power inverter which provides highly efficient operation and effective power output at relatively high frequencies, and which is adapted to be excited by variable frequency means to provide a variable frequency power output for the variable speed control of high frequency induction motors and the like.

It is also an object of this invention, to provide a high frequency thyratron power inverter system which is adapted for two-phase excitation and power output for the operation of two-phase industrial high speed motors with maximum efficiency at any desired speed and under variable load conditions.

It is also a further object of this invention, to provide an improved electronic-tube high-frequency power supply system of the parallel or full-wave inverter type, for the two-phase operation of high speed induction motors in direct driving connection with machine tool spindles, which is adapted for excitation at variable and relatively high frequencies over a relatively wide frequency variation range corresponding to a full range of required tool speed variations, with adequate power and efficient operation of the thyratron tubes.

A present preferred form of high frequency electronic power supply system, in accordance with the invention, includes a pair of power inverter circuits of the parallel or full-wave thyratron type, adapted for two-phase operation in connection with an exciter system of the preferred type hereinbefore referred to which provides balanced excitation pulses or voltage in push-pull relation in each inverter. Rectified polyphase power at any commercial frequency is provided for operating the inverters, wholly without the usual filtering, and the two-phase alternating current power from the inverters is provided at a relatively high frequency which is variable in accordance with variations in the frequency of the excitation voltages or pulses. Such power supply means provides for the elimination of mechanical speed change devices, gear trains and the like, in driving high-speed shafts of tool spindles by electric motor means, and represents an effective aid to industry in connection with such motor drive applications.

The problem of speed control through the use of adequate high frequency alternating current power, as supplied by inverter means in accordance with the invention, is further simplified by the fact that the motor speed may be varied over relatively wide ranges, substantially in direct proportion to the frequency variation of the excitation source for the thyratron inverters. This gain in flexibility is of great value in connection with the powering of the high-speed rotary tool elements of high speed grinders, woodworking machines and the like, requiring high speed cutters and other rotary tool elements for processing the work.

It is, therefore, a further object of the invention, to provide an improved thyratron power inverter which is responsive to speed variation control in a power supply system of the character referred to, and which is stable in operation at various frequencies corresponding to desired motor speeds, while at the same time providing adequate power under load conditions.

In a preferred form of high frequency power supply system for which the inverter of the present invention is particularly adapted, a variable frequency oscillator, operative over a relatively wide band of frequencies, as a speed-controlling variable-frequency source of excitation voltages or pulses, is coupled through suitable amplifying and phase shift means to a pair of power controlling inverter circuits gated or triggered to deliver alternating current power at the oscillator frequency to a motor load or other utilization means coupled to the output terminals of the inverter circuits.

The alternating current power is generated in parallel or full-wave connected thyratron inverter circuits utilizing impedance coupling with the excitation system for the application to the thyratrons of a series of positive pulses, whereby maximum negative biasing may be employed on the thyratron grids for establishing a minimum deionization time for most efficient operation, and utilizing a balanced anode circuit coupled to the load circuit through a special output transformer and anode circuit network, the preferred system providing for two-phase power through two separate full-wave thyratron inverters coupled to a common motor load.

Further in accordance with the invention, the balanced anode output circuit for each thyratron inverter includes a resistance-capacitance network between each pair of anodes and the power output transformer, together with resistance-loaded air-core choke coil means in the direct current power supply circuit for each pair of thyratrons, and load-current-controlled tap-changing means on the secondary of the power output transformer for bringing a motor load up to speed with maximum efficiency. In addition, the capacitor means or capacitance elements of each network in the anode circuits form part of L-C circuits with the output transformer primaries, which L-C circuits are adjustable in accordance with adjustments in the frequency of the excitation source and of the output voltage applied to the motor load, whereby maximum efficiency of operation is attained at all operating frequencies with a connected induction motor load.

It has been found that the use of air core inductive reactance in the individual anode current supply circuits for each inverter, together with the tuned commutating or controlling network in the balanced anode circuit of each pair of thyratrons, provides fully effective quenching of each thyratron independently of the firing of the other, under all load conditions and at all frequencies, and in such a manner that not only is full out-put power delivered under all conditions of load, but also the operating life of the thyratron tubes is greatly lengthened.

The controlling network comprises two series resistor elements interposed in each anode lead between the anode and the high potential terminal of each end of the primary winding of the output transformer, the primary winding itself (and reflected secondary load), the resistance loaded choke coil connected with the primary center tap, and selectable capacitor means, as above mentioned forming part of the L-C circuit with the primary winding and connected directly across the balanced anode circuit between the junctions of the series connected resistors in each anode lead.

An improved high frequency power inverter, of the two-phase, full-wave or parallel thyratron type, provided in accordance with the invention, with the foregoing and other features to be considered, is particularly adapted for supplying power at frequencies higher than the conventional industrial and mobile power frequencies now available for the operation of motor driven, high speed industrial equipment and particularly high speed grinders.

The present inverter, furthermore, is readily operable over a wide range of control or excitation frequencies, for example of from five hundred to seventeen hundred cycles per second for presently considered power applications, and this is made possible by the improved thyratron commutation control attained through the use of the anode circuit networks and the inductance of the output coupling transformers and reflected load in the balanced anode circuits, as above pointed out. Furthermore, the output voltage for starting a motor load is made automatic in adjustment, in accordance with the load current requirements of the motor, whereby the motor means is rapidly brought to full speed without seriously affecting the normal operation of the thyratron inverter connected therewith, and permitting the overall efficiency of the thyratron inverter to be maintained at a relatively high level under all conditions of frequency adjustment or variation of load. In meeting the high frequency and other operating requirements, the thyratron power inverter system of the present invention embodies a relatively simple and low-cost circuit arrangement readily adapted for excitation by any suitable pulse or oscillation voltage supply means and operation from any suitable commercial source of alternating current power.

As has been indicated hereinbefore, the presently preferred use for a thyratron power inverter embodying the invention, is in a variable speed motor control system for the conversion of substantially ripple-free rectified direct current power into alternating current power for motor operation at any desired high frequency, under control of a variable or fixed frequency excitation source. The latter is provided with a phase shift network for deriving two-phase excitation, together with means for advancing the excitation voltage from either phase to effect a balance in the loading of the conversion means, which provides two-phase power output and includes two pairs of thyratrons or grid-controlled hot-cathode gaseous-discharge tubes in parallel or balanced relation for full wave operation.

Such thyratron tubes may be employed, as is well known, to control relatively heavy unidirectional current flow, and operate in response to the application of positive potentials to the anodes while the control grids are brought to predetermined potentials in a positive direction, at which potentials the tubes conduct or fire, being arranged to fire alternately in a full-wave or parallel inverter. The tubes become deionized, and again non-conducting, when the anode potentials fall below the ionizing potential after the control grid potentials have been reduced in a negative direction to predetermined low values.

It is a still further and important object of the invention, to provide an improved method and circuit means for operating a pair of gas triodes or thyratrons effectively as alternating current power producing means in a variable frequency power supply system, in connection with an improved power output transformer and output circuit, whereby control or excitation potentials at frequencies far in excess of the maximum rate considered practicable for proper deionizing action with tubes of that type, may be applied thereto. In this way the power handling capabilities of gas triodes or thyratrons may be utilized to the fullest extent in supplying alternating current power at frequencies representing desired high speeds in industrial motor applications of the type referred to, and operate effectively at frequencies which heretofore have been considered impractical.

Each of the thyratron inverter stages in the two-phase system referred to, operates to supply power to one phase of a two-phase motor. Each inverter stage is excited independently of the other by one of the two-phase excitation voltages, through separate channel amplifier means, and each inverter is likewise provided with a separate control network in the output anode circuit thereof, the latter network operating to provide improved commutation of the thyratron tubes and effectively controlling the power load currents without limiting the useful power output therefrom.

It is also an object of this invention, to provide an improved thyratron inverter power supply system of the foregoing type for two-phase operation, which may be balanced for loading each phase substantially equally when connected to an unbalanced load.

In order that the motor load on each phase may be equalized in accordance with the foregoing object, the phase shift network in the excitation system is provided with control means for advancing the phase relation of one output voltage with respect to the other, thereby increasing or decreasing the normal 90° relation of these voltages and the excitation of the corresponding thyratron inverters. This results in a corresponding change in the phase relation of the two-phase output voltage applied to the motor load and serves to correct for any tendency of the motor load to be unbalanced, as may be the case where the windings of a motor are not exactly 90° apart under load conditions. By observing the output voltage of each phase at the motor, the load may be balanced by advancing one or the other of the excitation voltages in phase to the required degree.

The operating conditions thus established in connection with each inverter are such that extremely long tube life is attained without impairing the effectiveness of the inverter system as a power supply means, thereby providing for the full use of thyratron and similar gas triodes in the control of alternating current power from a direct current source, with a high degree of efficiency and economy of operation.

The novel features that are considered to be characteristic of this invention are set forth with particularity in the appended claims. The invention per se, however, both as to its organization and method of operation, as well as additional objects and advantages thereof, will further be understood from the following description when read in connection with the accompanying drawings, in which:

Figure 1 is a schematic diagram of a high frequency power supply system provided with a two-phase thyratron inverter and control means therefor embodying the invention.

Figures 2, 3 and 4 are frontal perspective, side, and rear views, respectively, of a physical embodiment of the system of Figure 1, showing certain constructional features and details thereof and a present preferred arrangement of certain of the major elements of the system.

Figures 5 and 6 are elevation and end views, respectively, of one of the transformer elements of the system of Figure 1, constructed in accordance with the invention and further shown in Figures 3 and 4, being on an enlarged scale with respect to the showing in Figures 3 and 4, and Figures 7 and 8 are views in elevation and in cross section, respectively, of a controlling inductor for the system of Figure 1, constructed in accordance with the invention and further shown in Figures 3 and 4, being also on an enlarged scale with respect to the showing in Figures 3 and 4.

Referring to Figure 1, two pairs of thyratron tubes 10—11 and 12—13 are separately excited from a high frequency source, such as a sine-wave oscillator 14, which is arranged, as hereinafter described, to apply excitation potentials or triggering pulses to the thyratrons alternately in each pair, and in adjustable phase displacement between the pairs of thyratrons to provide a two-phase power output at the source frequency.

In the present example, the high frequency exciter system is arranged to be adjusted in frequency by operation of a control element 15 on the oscillator 14 for any desired number of frequency ranges or steps, through each of which ranges the frequency of the exciter system is variable by means of a second control element 16 on the oscillator. The high frequency exciter system of which the oscillator 14 is a part, may be taken to represent an exciter system as initially referred to herein and included under the legend in the drawing, as being preferred for use in a power supply system in accordance with the invention.

The present power supply system, in its entirety, provides controlled high frequency power adapted for operation of high speed induction motors and the like, in direct connection with high speed tools, and accordingly, the thyratrons 10—11 and 12—13 are, in the present example, arranged to provide power to drive a high speed tool 17 by means of a direct connected two-phase motor 18 having a squirrel cage rotor 19 and two-phase operating windings 20 and 21. The operating windings are provided with two separate input leads 22 and 23, respectively, and a common input lead 24.

Alternating current two-phase power is applied to the motor through the thyratrons 10—13, under control of the high frequency exciter system, from a direct-current power supply system 25 having positive and negative power output leads 26 and 27, respectively, the alternating current power output from the thyratron inverters being applied to the motor through separate power output transformers 28 and 29, designed to transmit such power with maximum efficiency and to form part of the thyratron control network for effecting improved commutation.

The cathodes or filaments 30 of the thyratrons are connected in parallel through filament supply leads 31 to the secondary 32 of a filament supply transformer 33, having a primary winding 34. One of the filament supply leads 31 is connected, as indicated at 35, with a ground lead 36 for the power supply system and inverters, which in turn is connected with the negative power supply lead 27 from the direct current power source 25. The lead 36 is also connected through a cable 37 and plug connection 38 with an amplifier and phase inverter portion 39 of the high frequency exciter system for effectively grounding the power supply system throughout.

The amplifier and phase inverter means 39 is coupled to the excitation source 14 through a phase-shift network 40, which provides at output terminals 41 and 42, a two-phase voltage output from the single phase source 14. A voltage equalizer amplifier 43 is connected with the terminal 42 to equalize the output voltage therefrom with respect to the output voltage at the terminal 41 for all frequencies at which the source 14 is operated, as will hereinafter appear.

The two-phase excitation voltage from the high frequency exciter system is applied to the inverters 10—13 through output leads 44—47, the leads 44 and 45 being connected, respectively, with the control grids 48 and 49 of the thyratrons 10 and 11, and the leads 46 and 47 being connected, respectively, with the control grids 50 and 51 of the thyratrons 12 and 13.

In a preferred form of the exciter system initially referred to, the leads 44—47 provide sharp positive triggering pulses in response to operation of the high frequency exciter system, in two-phase relation, as indicated by the pulse wave diagram interposed between the leads, and the present thyratron inverter system may be considered as being pulsed or excited in the manner indicated. The leads 44—45 provide the phase A pulses, while the leads 46—47 provide the phase B pulses, and the two phases are so indicated in the drawing.

In operation, the lead 44 and the grid 48 of phase A receive a triggering pulse 52, followed at a one-quarter wave interval by a triggering pulse 53 from the lead 46 on the grid 50 of phase B. This is followed by a pulse 54, one-quarter wave later, on the lead 45 and the control grid 49 of phase A, and the pulse cycle is completed by the pulse 55 on the lead 47 and the control grid 51 of phase B, whereupon the cycle repeats, as indicated by the pulse 56 on lead 44 and the control grid 48 of phase A.

In this manner, the phase or channel A thyratrons 10 and 11 are alternately pulsed with a positive pulse each half cycle or 180 electrical degrees in the excitation voltage wave, and the control grids 50 and 51 of the phase or channel B thyratrons are likewise pulsed each 180 degrees or each half wave, and normally lagging the pulsing of the phase A thyratrons by 90 degrees. Any other suitable pulsing of the thyratrons may be provided whereby they are alternately fired in each phase on alternate half cycles of the pulsing frequency wave.

The herein described pulsing system is presently preferred, as it permits operation of the thyratrons as described in connection with the excitation system initially referred to, with maximum rated negative biasing potential on the thyratron grids, whereby the quenching time is reduced to a minimum without involving any undesirable operating characteristics which might result from negatively pulsing the highly negatively biased tubes under load conditions.

The negative bias for the control grids 48—51 is separately supplied to the thyratrons from the high frequency exciter system through a lead 57, also included in the cable connection 37, and connected with the grids 48 and 49 through grid resistors 58 and 59, respectively, and to the grids 50 and 51 through grid resistors 60 and 61, respectively, the negative bias potential being applied between the leads 36 and 57 from the high frequency exciter system, and being of an order such that the tubes are operated at substantially the maximum rated negative bias in the absence of signals from the exciter system.

It will be noted that the grids 48—51 are provided with series current limiting resistors 63 provided with bypass capacitors 64, whereby excessively high amplitude pulses are prevented by reason of the potential drop on the resistors from driving the grids above a predetermined relatively low positive potential, such as eight volts, for example, while the capacitors permit the pulses to trigger the grids at high frequencies.

The capacitors 64 are sufficiently small in value so that the time constant of the resistance-capacitance combination in each grid connection is less than the period for one cycle of the highest frequency at which the inverter is operated. A greater time constant might result in a cumulative negative charge sufficient to cause blocking. A capacity value of .05 mfd. and a resistance value of 12,000 ohms has been found to be effective in the system shown, for maximum frequencies of the order of 1700 cycles per second.

The output transformer 28 for the phase A thyratrons 10—11 is provided with a primary winding 65, having a center tap 66 and having its terminal ends connected through anode leads 67 and 68 with the anodes 69 and 70, respectively, of the thyratrons 10 and 11. Interposed in the anode lead 67 between the anode 69 and one terminal of the primary 65 are two series resistors 72 and 73, and likewise in the anode lead 68, between the anode 70 and the opposite terminal of the primary 65, are two similar series resistors 74 and 75. Each anode lead, therefore, includes two resistors in series between the anode and the primary windings 65 of the output transformer. These resistors may be substantially equal in resistance value, and in the present example, may be considered to be of the order of three ohms each.

The thyratrons 12 and 13 in phase or channel B are likewise connected with the primary winding 78 of the output transformer 29, through a similar balanced anode circuit comprising the anode leads 79 and 80, the lead 79 including the series resistors 81 and 82 interposed between the anode 83 of the thyratron 12 and one terminal of the primary 78, and the lead 80 including resistors 85 and 86 serially between the anode 87 of the thyratron 13 and the opposite terminal of the primary winding 78. It will be noted that the primary winding 78 is likewise provided with a center tap 88, corresponding to the center tap 66 for the primary winding 65.

The center tap 66 on the primary winding 65 is connected with the positive direct-current power supply lead 26 through an air core choke coil 90, a connection lead 91 and an operating coil 92 of an overload relay 93. The choke coil 90 is provided with a shunt-connected peak voltage limiting resistor 94. In the same manner, the center tap 88 on the primary winding 78 is connected with the positive supply lead 26 of the direct-current power source through a similar air core choke coil 95, a connection lead 96 and the operating coil 97 of an overload relay 98. The choke coil 95 is likewise provided with a peak voltage limiting shunt resistor 99.

With this arrangement, each pair of thyratrons is provided with a balanced or push-pull output circuit which is supplied with direct-current power through the center taps 66 and 88, and each anode circuit includes two series resistors in each branch, the resistors forming the series arms of a control network in the output anode circuits. The control network further includes each half of the transformer primary, and the air-core choke coil connected with the primary tap and being common to both anode circuits.

Further, as part of the control network in each inverter across the anode circuits, are a series of capacitors such as capacitors 105, 106, 107 and 108 in the phase A inverter, which are selectively connectable through a four-point selector switch 110, in shunt across the balanced anode circuit, between the anode leads 67 and 68, and in symmetrical relation to the series resistor arms, and provide an adjustable shunt capacitive arm for the network.

Likewise, in phase B, a corresponding series of capacitors 112—115 are selectively connectable through a four-point selector switch 116 across the anode circuit 79—80 between the two series resistive arms on each side of the circuit. Both switches 110 and 116 are connected, as indicated by the dotted lines 117, 118 and 119, for joint operation with the range control knob 15 of the signal or voltage source 14, whereby the various capacitors are selectable in accordance with adjustments of the frequency range of operation of the voltage source. The capacitors 105, 106, 107 and 108, used in the subject construction, may, by way of example, have capacitance values of .08 mfd., 1.0 mfd., 1.4 mfd. and 1.9 mfd., respectively. Capacitors 112, 113, 114 and 115 may, therefore, have identical values in the same respective order.

Four speed or frequency ranges are provided by the range control 15, with variation in each range provided by the frequency or R. P. M. control 16 in connection with the excitation voltage source 14. Accordingly, the switches 110 and 116 provide a corresponding number of capacitor changes. However, any additional or lesser number of steps may be provided, depending upon the number of operating ranges desired.

The excitation voltage source 14 for the thyratrons may be a sine-wave oscillator as indicated, or other suitable source of sine-wave voltage, and provides a single phase output voltage between output leads 125 and 126. It may be considered that the lead 126 is a ground lead connected also with the voltage equalizer amplifier 43 and with the remainder of the excitation system 39, and thence through the cable connection 37 to the ground lead 36 for the thyratron inverters.

The phase shift network 40 hereinbefore referred to provides means for deriving a two-phase output voltage from the single phase excitation source 14, and includes two parallel branch circuits which are effectively connected between the lead 125 and ground lead 126, the one branch comprising a resistor 127 and a capacitor 128 in series, with the capacitor connected directly with the ground lead 126, and the other branch including a capacitor 130 and a resistor 131 in series, with the resistor connected directly with the ground lead 126. The capacitance and resistance in the second branch are, therefore, in reverse order from those in the first branch, with respect to the connection with the lead 126. The opposite end of each branch is connected through a four-pole double-throw switch 132 selectively with the oscillator output lead 125, either directly or through an adjustable phase advance circuit including a capacitor 139 and a variable resistor 140 connected in parallel therewith. The switch is shown in a position to provide a direct connection between the branch 130—131 and the output lead 125, whereas the branch 127—128 is connected to the lead 125 through the adjustable phase advance circuit 139—140.

The phase advance circuit is thus arranged to be included in one or the other branch of the phase-shift network, and provides means for varying the two-phase relation between the output voltages derived from the terminals 41 and 42 to a predetermined degree, above or below the normal 90° relation provided by the phase-shift network in which equal capacitors and resistors are provided. By way of example, the resistors 127 and 131 may each have a resistance of 100,000 ohms, while the capacitors 128 and 130 may each have a capacity of 0.1 mfd. on the circuit shown. The resistor 140 may have a maximum resistance of 250,000 ohms and is preferably variable to zero ohms, and the capacitor 139 may have a value of .0056 mfd. in the present example. The parallel-connected resistance-capacitance circuit 139—140 provides for advancing the phase of the voltage derived from the branch of the phase-shift network in which it is connected. Hence, in the present example, with the switch 132 in the position shown, the phase of the voltage derived from the terminal 42 may be advanced with respect to the phase of the voltage derived from the terminal 41, and therefore causes the two output voltages to be separated in phase by less than 90 degrees. This phase relation may be adjusted back to 90 degrees by adjusting the variable resistor 140 to zero resistance.

In a similar manner, when the phase advance circuit is connected in the other branch of the phase-shift network, the phase of the voltage derived from the terminal 41 may be advanced a corresponding amount and is adjustable in the same manner. The phase difference between the two output voltages from the phase-shift network will then differ by greater than 90 electrical degrees when the resistor 140 is adjusted for greater than zero resistance. The phase shift network or phase divider 40 is therefore provided with means for advancing either phase a predetermined amount, thereby to vary the phase relation of the output voltages applied to the motor 18 or other two-phase load, as will hereinafter be described.

The switch is operable by a control knob or lever 133, which may be placed at any convenient location and set in one position or the other as the load characteristics are determined in any case. The final adjustment of the phase relation may then be controlled by adjusting the resistor 140, which may be controlled through suitable mechanical connection means 142, indicated by the dotted line, with a control knob 143 located in convenient operating relation to a voltmeter 144, whereby the latter may be observed for balancing the voltage across the two output phases of the inverter.

It will be noted that the output terminal 41 is connected through a lead 135 with the amplifier and phase inverter portion 39 of the exciter system, whereas the output terminal 42 is indirectly connected therewith through the voltage equalizer amplifier 43 and an output lead 136. This is for the reason that the phase shift network produces a voltage variation in one phase due to frequency variation in the exciter voltage from the source 14, that is, variation in the voltage from the output terminal 42.

The voltage equalizer amplifier 43 is interposed in the output connection for the lagging phase or terminal 42 as shown, and operates automatically to restore or equalize the voltage derived from terminal 42 with respect to the voltage derived from terminal 41, whereby both channels of the amplifier and phase inverter, and ultimately both thyratron inverters, may receive excitation pulses or voltages of equal amplitude, for balanced operation of a two-phase load such as the motor shown.

The adjustable phase advance circuit in the phase shift network further provides for balancing the two-phase load, particularly in the case of a motor in which the windings of the two phases are not exactly in quadrature, tending to draw an unbalanced current from the two inverters under load conditions. If the reactance of the thyratron anode circuits approach resonance at the established frequency of operation (including the reactances reflected into the transformer primaries by the load), then a phase error may be introduced by slight differences in the electrical characteristics of the capacitors, the choke coils, and the output transformers in the two anode circuits. This error is easily corrected by the adjustable phase advance circuit, which is used to balance the two voltages across the phases of the load.

It will also be noted that the oscillator 14 and the voltage equalizer amplifier 43 are provided with anode potential and filament current supply through a cable connection 129 with the amplifier and inverter section 39 of the exciter system which includes the power supply means for the system.

Referring to the load circuit, the phase A and phase B leads 22 and 23 for the motor 18 are connected, respectively, through the output transformers 28 and 29 with the two thyratron inverters as hereinbefore noted, the lead 24 being common to both phases. The three motor leads are connected preferably through a plug connector 150, with corresponding secondary output leads 151, 152, and 153, which in turn are connected with the respective secondary windings 154 and 155 of the output transformers 28 and 29. These connections are controllable by means of switches and relay contacts, whereby the voltages applied to the motor in each phase may be adjusted for starting and running as well as for differing frequencies or operating speed ranges.

In the present example, the lead 151 is connected with a relay 157 having contacts 158 by which it is selectively connectable through contacts 159 and 160, with the terminal lead 161 or a tap 162 on one end of the transformer secondary 154, while the lead 153 is connectable through a tap switch 163 with one terminal end 164 or a tap 165, at the opposite end of the winding 154. The switch 163 is shown as a four-point switch and provides a connection for the lead 153 with the tap connection 165 in the position shown. When moved to the left, as viewed in the drawing, through the remaining three contacts, the switch 163 provides for connecting the lead alternately to the end terminal lead 164 and again to the tap 165, and finally to the end connection 154 in the order named, for alternately increasing and decreasing the available output voltage between the lead 153 and the lead 161, for different frequencies and operating speeds.

The phase B lead 152 is likewise selectively connectable through relay contacts 168, with contacts 169 and 170, which are connected respectively with the end lead connection 171 and a tap 172 on the secondary 155 of the transformer 29. At the opposite end of the winding, a connection is further provided for the common lead 153 through a four-point switch 175 with the end lead 176, and a tap connection 177, in the same arrangement and for the same purpose, as similar connections for the secondary 154 above described.

The relay contacts 158—160 and 168—170 are simultaneously operable by means of the relay armature or movable element 180, in response to energization of the relay winding 181, across which is connected a shunt capacitor 182. A variable resistor 183 serves to limit and control the operating direct current applied to the relay coil 180 by rectification of the alternating current from a portion of the secondary 154 through a circuit lead 185 in which is located a contact rectifier device 186. The lead 185 is connected to the tap 162 as shown, and the return circuit for the relay coil is connected with the end lead 164 of the secondary 154, whereby the voltage between the tap 162 and the lead 164 is applied to the winding through the rectifier device 186. The current derived therefrom is smoothed by the capacitor 182, and the strength of the operating current for the relay is determined by the adjustment of the resistor 183.

It will be seen that this circuit arrangement is such that, as the power is applied to the motor or other load through the transformer 28, current from the taps 162 and 172 are applied to phases A and B, whereby a low operating voltage is applied to both phases of the motor, thereby reducing the effective load on the thyratron inverters to a safe limit on starting. As soon as the motor comes to normal speed, or the load is reduced sufficiently so that the voltage can rise at the relay device, the armature is moved upwardly, as viewed in the drawing, thereby switching the motor phase A and phase B connections, through the relay contacts 159 and 160, respectively, to the full voltage terminals provided by the end leads 161 and 171.

It will be noted that one voltmeter lead 190 is connected with the common lead 153, whereas the other voltmeter lead 191 is connected through a two-point switch 192 and leads 193 with the with the leads 151 and 152, whereby the voltmeter 144 may selectively be connected with either phase of the output circuit, that is, of the motor load, to obtain an indication of the load conditions in each phase.

Considering, now, the direct current power supply system 25 for the thyratron inverters, it will be seen that the positive and negative output leads 26 and 27 are connected, respectively, with the cathodes 195 of three full-wave rectifiers 196, and with the center taps of the secondary windings 197 of a power transformer 198. The corresponding primary windings 200 are connected serially in pairs, and are then delta-connected to three-phase supply lines 201 having an input plug connector 202. This arrangement provides for six-phase operation of the full-wave rectifiers 196 from the secondaries 197 and insures a smooth direct current power output without costly filtering means.

The power input to the inverter power supply system is controlled by a three-phase main switch 203 and a three-phase relay switch 204 serially connected in the supply lines 201 from the input plug connector 202. The relay switch is provided with an operating coil 205 and an armature element 206 responsive to energization of the coil to close the three-phase circuit through the switch. An auxiliary pair of contacts 207 is arranged to be closed at the same time.

It will be noted that protective fuses 208 may be included in the lines 201, adjacent to the plug connection 202. When the plug 202 is connected with a suitable source of alternating current and the switches 203 and 204 are closed, the anodes 210 of the rectifiers ar energized and and the resulting D.-C. power is available for the inverters at the output leads 26 and 27.

Protective control means are provided for preventing the application of power to the anodes until the filaments 195 have had sufficient time to become heated to the proper temperature. For this purpose, the filaments are connected in parallel to a secondary 212 of a filament and control current supply transformer 213, the primary 214 of which is connected through leads 215 directly with one pair of the three-phase leads 201 at a point between the switch 203 and the switch 204, whereby, upon closing of the main switch 203, the filaments 195 are energized in advance of the anodes 210. At the same time, through a secondary 218 on the transformer 213, a pair of supply leads 219 for the pulse supply system are energized. It will be noted that these leads are connected through the cable 37 and the plug connection 38 with the pulse supply system 39—40—14, whereby at the same time, excitation at the desired frequency is applied from the energized exciter system to the thyratron grids in proper phase relation for two-phase operation.

The control current supply transformer secondary 218 also serves to energize two pilot lights 222 and 223, the former directly, and the latter indirectly through a delay relay having contacts 224 which close under control of a relay winding 225. The relay winding is connected directly with the secondary 218 and operates with a predetermined delay to close the contacts. Approximately 60 seconds delay is normally provided in the system shown, whereupon the pilot light 223 is energized along with the pilot light 222 which receives energy as soon as the transformer 213 is energized. By this means, an operator can observe when the system is ready to apply power to the motor.

The operating winding 205 of the power relay switch 204 is connected in circuit with the delay relay contacts 224 and the secondary 218 through a control circuit which may be traced from a connection 230, through the winding 205, thence through a lead 231, the normally closed contacts 232 for the overload relay 93, and the normally closed contacts 233 of the overload relay 98, thence through a stop switch 234, and the contacts 235 thereof which are normally closed as shown. The circuit may further be traced from the stop switch contacts 235, through a lead 236 to the auxiliary contacts 207 of the switch 204, and thence through a connection lead 237 and the delay relay contacts 224, to the opposite side of the secondary winding 218.

From the contacts 235 of the stop switch 234, an alternative or second return path may be traced through a start switch 240, the contacts 241 of which are normally open, thence through a connection lead 242 to the lead 237, thereby shunting the auxiliary contacts 207 of the switch 240. Thus, with the power switch 203 closed, and the transformer 213 energized, current flows from the secondary 218 not only to the pilot light 222, but also to the operating winding 205 of the switch 204, as soon as the delay contacts are closed and the start switch 240 is likewise closed.

Upon closure of the relay switch 204 by operation of the start switch 240, the entire power supply system 201 is energized, and the auxiliary contacts 207 are then closed, thereby maintaining operating current on the winding 205 to maintain the switch 204 in the closed position until the circuit is opened by operation of either of the overload relays 93 or 98 in each of the inverter anode current supply circuits, or until the stop switch 234 is operated. The start switch 240 is not operative during the initial warm-up period until the pilot light 223 is lighted, along with the pilot light 222. These lights are preferably colored, as indicated, green and red, respectively.

It will be noted that a high frequency filter means 246 is provided in connection with the direct-current power supply system and is connected across the output circuit between the output leads 26 and 27. The filter comprises a filter capacitor 247, and a resistor 248 of relatively low resistance, connected in series, together with a second resistor 249 connected in parallel with the series-connected resistor and capacitor. The resistor 248 is provided to limit the peak current through the filter capacitor 247, and the capacitor filters high frequency transient pulses occurring as a result of the power rectification and the firing of the thyratrons. The shunt resistor 249 provides a leak for the discharge of the capacitor 247 when the equipment is de-energized.

Referring now to Figures 2, 3, and 4, along with Figure 1, a present preferred arrangement of the inverter system, and of certain parts thereof in accordance with the invention, is shown. This arrangement provides for operating convenience and effective heat dissipation, as well as for accessibility, particularly for inspection of the internal elements and replacement of the tubes. Like parts throughout are designated by the same reference numerals as in Figure 1.

The apparatus is contained in a cabinet 255, having a panelled front and ventilated top, sides and back, mounted on a welded angle-iron frame structure providing supporting legs 256 to maintain a required standard installation clearance below the cabinet and a convenient operating height for the control panel. The top, side and rear walls are provided by perforated cover plates 258—259, mounted in sections on the angle-iron frame. The rear wall is not shown in the drawing to provide a view of the interior. The cabinet is divided generally into three sections or compartments, that is a top section 260, a middle section 261, and a bottom section 262. The exciter system is located in the forward portion of the top section. The large anode circuit resistors occupy the rear of the top section, the remainder of the inverter system is located in the middle section, and the power supply system is located in the bottom section. The arrangement is such that good heat dissipation is obtained for the resistors and tubes without excessive heating of other elements of the system.

It will be noted that the top section of the front panel includes the control element 16 for varying the frequency of the excitation voltage source as a speed control means, and has a dial 263 calibrated in R. P. M. The start and stop switches are provided with operating buttons 265 and 266, respectively, on the top section of the front panel and positioned for easy operation. The voltmeter 144 and selector switch 192 are positioned on the right-hand side of the section, with the control knob 143 just below the voltmeter for control of the phase shift network in balancing the load on the inverters, as hereinbefore referred to. The operating switch control element 133 for the phase shift network is likewise positioned in the top section of the panel.

The range control knob 15, also connected with the excitation voltage source, and the various selector switches 110, 116, 163, and 175, is mounted at the center of the middle section of the panel, directly above the control handle 268 for the power switch 203. The various switches controlled thereby are mounted in rear of the panel, the selector switches and range control elements being contained in a casing 269, as shown in Figures 3 and 4. A heat-insulating protective wall 270 made of asbestos board or metal is provided between the resistors in the rear of the top section and the exciter system comprising the elements 39, 40, 14 and 43 which are mounted on a short shelf 275. The various connections with the switch and control elements in the casing 269 are made through cables 271, as shown more clearly in Figures 3 and 4. The anode connections for the thyratron tubes 10—13 with the anode circuit resistors 72, 74, 81 and 85 are indicated by the heavy leads 273 and 274. Other connections are omitted in the drawing, for the sake of clarity.

The thyratron inverter power output transformers 28 and 29 are also mounted in the middle section of the cabinet, on opposite sides, and are supported by a shelf 276 which extends across the width of the cabinet. These transformers differ mechanically from conventional power transformers of similar core cross-section in the core window requirements, as the coil cross-section is relatively small. The details of the transformers are shown more clearly in Figures 5 and 6.

A large amount of iron is required to handle the peak values of the magnetic flux which occurs during each cycle of operating frequency. The transformer operates at approximately 9 volts per turn, with peak flux densities beyond that of conventional transformer design practice. The average currents in the primary and secondary coils are such that the coil dimensions modify the proportions of the core laminations from that which are normally standard in conventional power transformer construction. Furthermore, the complex wave form of the voltages developed by the thyratron commutation across the transformer primary adds to the high peak values of magnetic flux attained in proportion to the values normally encountered in conventional transformer design practice. The transformer is, therefore, larger and heavier than a conventional power transformer for the same power output at the same frequency.

Referring more particularly to Figures 5 and 6, a construction which has been found to be successful in practice is shown. The laminated core 278 of the transformer 28 which is the same as transformer 29, is of relatively large cross section, as is also the center leg 279, so that the space $w$ or window 280 between the center leg and the outer portion of the core is relatively small. The coil winding 281, therefore, occupies only a relatively small space, and by way of example, may comprise a primary winding of substantially ninety turns of No. 14 wire, tapped at the forty-fifth turn, and a secondary winding of twenty-eight turns of No. 14 wire, tapped at the fifteenth and twentieth turns, in the system shown, for approximately 2½ kva. power output.

The present transformer is substantially ten inches square, and the core width as viewed in Figure 6, is approximately four inches. A one-half inch coil window is provided, when normally the coil window for a conventional transformer of the same cross section would be approximately two and one-quarter inches. This core is of the best grade "audio" iron with thin laminations to minimize core heating. The transformer is provided with suitable side plates 282 and mounting feet 283, the plates and mounting feet below clamped on opposite sides of the core by means of clamping bolts 284. The winding terminals are indicated at 285 in Figure 6. The whole structure is massive and rigidly mounted.

The reactors or air core choke coils 90 and 95 are mounted in the center of the middle section of the cabinet, in rear of the inverter tubes 11 and 12, as shown more clearly in Figure 4. The choke coils, shown by the coil 90, are held in place by suitable clamping means 288.

In the present embodiment of the invention the choke coils have an inductance of approximately 1.5 millihenry and comprise 157 turns of No. 10 Brown & Sharpe gage enamelled wire, all turns air-spaced, and the several layers airspaced by means of strips of low-loss insulating material placed perpendicular to the turns at intervals around the circumference of each layer of the coil. These insulating strips may be made of "Mycalex" or "Mykroy," forms of mica-filled glass and cut from one-eighth inch sheet stock in strips one-quarter inch wide and three and one-half inches long. The choke coil above described may be wound on a suitable form 290, providing a coil opening of approximately two and three-quarters inches by two and one-eighth inches, as viewed in Figure 7, which shows the coil in elevation, and the length of the coil, as viewed in Figure 8, may be aproximately three and one-half inches, in the present example. The outside dimensions of the choke coil, as viewed in Figure 7, may be approximately six and three-eighths inches in height by five and three-quarters inches in width. If desired, the wire with which the choke coils are wound may be stranded with individually insulated strands for more effective current conduction at the high frequencies involved.

Referring to the lower section of the casing, a door 292 may be provided on the front panel for inspection of the relay switch 204 and the overload relays 93 and 98. The pilot lights 222 and 223 are also mounted in the lower section of the panel, together with output and input plug connectors 150 and 202, respectively. For convenience in making operating connections with the apparatus, a cable connection 294 for a motor load, is provided with a detachable plug 295 for the output plug connector 150 and likewise a supply cable 296 from the three-phase power is provided with a detachable plug 297 for the plug connector 202.

Because of its compact construction, the entire apparatus may be moved to different locations for operation of high speed motor driven equipment, or when installed in a fixed position, occupies a minimum of space. The panel connections provide for readily connecting the motor load and power supply and placing the system in operation, and are located at the front of the apparatus along with the operating controls for this purpose.

Within the lower section are mounted the main power supply transformer 198, the three rectifier tubes 196, and the transformers 33 and 213, together with connecting wiring which is not shown for the sake of clarity. While any other suitable arrangement of the various elements may be provided, the arrangement shown is at present preferred for most efficient operation and heat dissipation, as well as operating convenience.

From the foregoing description, it will be seen that a thyratron inverter system embodying the invention, may be arranged as a compact installation unit adapted for use as a power source for industrial control purposes in connection with any suitable motor load, and may be adapted for use in fixed or temporary locations as desired. All of the operating controls are reduced to a minimum commensurate with proper operation and adjustment.

Considering, now, the operation of the system, it will be seen that the two full wave inverters are excited separately from an exciter system providing a two-phase voltage output. This includes an adjustable phase shift network following the sine-wave oscillator or other single-phase excitation voltage source, and preceding a dual channel amplifier and phase inverter. The wave shape of the excitation voltage may be sinusoidal, but is preferably pulse-shaped as applied to the inverters, and preferably consists of single positive pulses, for operating the thyratrons alternately in each pair, the phase relation of the pulses between the pairs of thyratrons being adjustable through the phase shift network, to advance one or the other of the phases as required for load balance. Filament power to the thyratron cathodes is supplied by the transformer 33, which is energized from one phase of the primary three-phase power source which may be the usual commercial 220/440 volts alternating current at 60 cycles. The thyratrons are provided with biasing potentials for the grids from the potential supply means provided in the exciter system or other separate source, apart from the thyratron anode current supply.

Direct current power for the thyratron anode circuits is supplied by the six-phase rectifier system through the full-wave rectifier 196. This system provides uniform direct-current voltage under load with less than 2% ripple voltage, without the use of costly inductance or capacitance filtering, which is an important consideration due to the high values of current supplied. To avoid damage to the thyratron cathodes and to the cathodes of the rectifiers, rectification is delayed by means of the delay relay 224—225, for a minimum period of approximately sixty seconds after the main power switch is closed. The closing of the main switch 203 directly energizes the transformer 213 at the same time the transformer 33 is energized, and the transformer 213 serves to energize the filaments of the full-wave rectifiers 196 from one secondary winding while the other winding supplies power at a normal 117 volts to the delay relay 224—225, the red panel indicator lamp 222, and the power supply circuit for the exciter system through the leads 219 and the plug connection 38.

The contacts 224 of the relay 224—225 close after the initial warm-up period, thus connecting the secondary 218 to the green indicator lamp 223 and to the control circuit for the starting relay 204. This control circuit is connected through the start and stop switches, the protective relays 93 and 98, and the holding contacts 207 of the power relay to the actuating coil 205 of the latter relay. When the starting switch button 265 is operated, the relay switch 204 is closed and remains closed until the stop button 266 is depressed, or until the protective relays 93 and 98 operate by reason of an overload in the direct-current power circuit through the inverters. The operating coil 92 of the relay 93 is in circuit with the thyratrons 10 and 11, while the operating coil 97 of the relay 98 is in circuit with the thyratrons 12 and 13. The operation of the start switch 204 connects the main power transformer 198 to the three-phase power source, resulting in a direct current power supply to the thyratron anode circuits.

Referring to the thyratron inverters per se, the thyratrons 10 and 11 are connected for push-pull or so-called parallel operation in connection with the anode circuit network and power output transformer. The control grids of these tubes are negatively biased through the supply connection lead 45 substantially to the limit of their rated potential, whereby minimum deionization time is provided when the grid control operates with a series of positive pulses shown diagrammatically in Figure 1.

The protective resistors 63 in the grid circuits are provided with shunt capacitors 64 for applying to the grids the triggering pulses at relatively high frequencies, while obtaining full advantage of the current limiting control provided by the resistors for protecting the thyratron control grids during positive voltage peaks, and during the thyratron conduction cycles.

In the anode circuits, two series resistance arms and a shunt capacitance arm, symmetrically connected to the series arms, are provided in the resistance-capacitance network. The two series arms in the phase A thyratron inverter comprise the resistors 72 and 73 in one anode lead and the resistors 74 and 75 in the other anode lead, with one of the controlling capacitors 105—108 connected between and symmetrical with respect to the series resistors, that is, between the junctions of the two resistors in each anode lead, and directly across the anode circuit, so that two resistors are interposed between the capacitors and the primary of the output transformer, in both sides or branches of the anode circuit of each inverter, and two other resistors are interposed between the capacitors and the anodes in both sides or branches of the anode circuit of each inverter. For example, the capacitors in the phase A inverter are so connected that the resistors 73 and 75 are in series with the operative capacitor and the primary 65 of the output transformer, and likewise the resistors 72 and 74 are in series with the capacitor and the anodes of the thyratrons 10 and 11. Since the thyratron inverter circuits are similar, the same arrangement is provided in connection with the thyratron tubes 12 and 13 in the phase B inverter.

The commutation action of each of the thyratron inverter circuits is the same and will be described in connection with the phase A inverter as follows: Assuming that the thyratron 10 has been fired by an excitation pulse 52 on the control grid, the voltage drop from the anode to the cathode is reduced to approximately eight volts, as shown by the voltage curve 300, and a charge appears across the operative capacitor 108. After the conduction cycle for the tube 10 is finished, the incoming thyratron 11 is fired by the excitation pulse 54, resulting in the anode of the tube 11 being reduced in potential to approximately eight volts, as indicated by the voltage curve 301.

The quenching of each thyratron during each cycle of operation may be understood by considering the detailed voltage changes on one thyratron anode during a part of a cycle of operation. At a particular instant when the thyratron 10 is conducting, a magnetic field is developing in the transformer core by reason of the current flow to the anode 69, and the capacitor 108 is at first discharging and then charging in the opposite polarity, so that the anode of thyratron 11 is at first increasingly negative, and then increasingly positive. This is the sequence beginning with the firing of the thyratron 10 by excitation pulse 52 at the start of any cycle during a steady state of operation, as shown by the curve 300 illustrating the voltage variation on the anode of thyratron 10 and by the curve 301 illustrating the voltage variation on the anode of thyratron 11 with respect to zero voltage levels indicated.

Finally the counter-electromotive force developed by the resonant rise in opposing current induced by the collapsing magnetic field and the charging capacitor becomes great enough to lower the voltage of the anode of thyratron 10 so that conduction ceases. At this point the slow decay of magnetic field sustains a slightly negative quenching potential so that deionization develops at a moderate but effective rate which does not cause rapid deterioration in the thyratron's characteristics. The natural period of the anode circuit supports this condition for a number of microseconds before thyratron 11 is fired, although no conduction occurs. The firing of thyratron 11 suddenly depresses the potential of the anode of thyratron 10 to an extreme negative potential of several hundred volts as the commutation capacitor 108 cannot discharge instantly. This action insures the complete removal of any remaining ions in thyratron 10.

Deionization is thus maintained at moderate potentials for an appreciable portion of the operating cycle, instead of depending on the excessive negative potential generated by the firing of the incoming thyratron which would result in deterioration due to the high acceleration of ions. Such deterioration would become more rapid at higher frequencies as the deionization cycle repeats at a faster rate.

Thus in an inverter power supply system in accordance with the invention, the quenching of the thyratrons does not occur in the manner of conventional inverters at lower frequencies. The quenching of the outgoing thyratron is not caused by the firing of the incoming thyratron, but instead, the reactive surge of the L-C circuit, composed of the control or resonating capacitor 108 (or of one of the other capacitors as selected) and the primary inductance of the output transformer 28, is sufficient to cause the outgoing thyratron to quench prior to the firing of the incoming thyratron. For an increasing load, reflected from the secondary of the transformer 28, this resonant circuit operation becomes more highly damped. Also, as the load is increased, the primary impedance of the transformer 28 decreases, so that the suppressor resistors 73 and 75 are of increasing importance in the retardation of the discharge of the capacitor for control or commutation purposes.

The suppressor resistors 72, 73, 74 and 75 not only isolate the capacitor 108 from both the thyratron anodes and the transformer primary, but also operate in series in each anode lead to protect the thyratrons 10 and 11 by limiting the peak currents to values within the maximum peak current rating for the type of thyratron used. The suppressor resistors 72 and 74 separate or isolate the commutation capacitor from the thyratron anodes, and appreciably reduce the peak inverse voltage developed by the control capacitor on each anode as the other thyratron fires.

The function of the choke coil or inductor 90 is important in the thyratron switching or commutation above referred to. Sharp negative voltage pulses occurring at twice the operating frequency of the thyratron circuit are developed across the inductor 90 at the instant each thyratron is fired. The instantaneous potential of the entire anode circuit fluctuates with this voltage. The sharp voltage transient developed by the sudden conduction of each thyratron when fired is largely reflected across the air-core inductor 90, instead of across the transformer primary, which would result in power loss and certain commutation difficulties if the inductor were not present. However, at high frequencies the excessive voltage peaks ordinarily developed across the inductor would result in transient voltages on the thyratron anodes sufficient to cause arcing and consequent breakdown of commutation, depending upon the maximum anode voltage rating of the thyratrons. This difficulty has been eliminated in the present system by the use of resistor 94 to limit and suppress the voltage peaks as necessary to maintain inverter operation. This resistor dissipates appreciable power at the higher frequencies of inverter operation. The resistor provided in the inverter circuit shown may have a value of the order of 150 ohms, and be adapted to dissipate 400 watts maximum.

This use of resistor suppression across the choke coils is important to the operation of the inverter system shown, at high frequencies, particularly with inert-gas-filled thyratrons, such as those using xenon. Xenon thyratrons are more practical for use in the inverter system of the present invention than hydrogen or mercury types, as hydrogen thyratrons require excessive operating voltages for large power output levels with attendant cost and operating hazard, and mercury thyratrons operate over a limited temperature range. Although xenon thyratrons have relatively lower voltage breakdown ratings, so that circuit protection against excessive voltage peaks must ordinarily be provided, in the present system, for industrial motor operation, relatively low output voltages may be provided and therefore advantage is taken of this type of thyratron to provide stable and dependable operation under all load conditions.

The natural frequency of the anode L-C circuit with secondary loading may be somewhat higher than the operating frequency in a well designed circuit, thus providing the earlier quenching of the outgoing thyratron by L-C resonance as above described. For this reason the control or resonating capacitors are changed for each frequency range of operation.

As hereinbefore stated, the foregoing description of the thyratron commutation or control in the phase A inverter circuit with respect to the tubes 10 and 11, applies in a like manner for the circuit of the phase B inverter and the tubes 12 and 13, that is, the operation of the thyratrons in either phase A or phase B is the same, although differing in phase.

The output circuit connection to the two-phase terminals or supply leads 151—153, from the transformers 28 and 29 is modified by the double-pole, double-throw relay switch means responsive to operation of the relay coil 181. For the heavy loading period during the starting of a motor, such as the motor 18, secondary taps for a lower voltage are connected. As the motor speed increases, the rising voltage across the secondary circuit of phase A results in an increasing D.-C. potential across the relay coil 181, so that the relay operates for a predetermined voltage level, thus connecting the motor load to the taps provided for the full output voltage. The relay, including the coil 181, is a direct-current type operated by the rectifier 186, which may be of the selenium type, and the operating voltage is adjusted by means of the resistor 183 to provide the correct relay operating voltage. An alternating-current relay would require a wide range of operating voltages over the wide frequency range of the present system, and therefore a direct-current relay is preferred.

With the motor in operation, the voltmeter 144 is selectively switched from one phase to the other, and again as the motor is loaded, to provide an indication of the load balance in each phase. Should a voltage unbalance be detected, indicating an unbalanced load condition, the control knob 143 is adjusted to equalize the voltages by causing a variation in the phase shift network. In case that a balance cannot be attained by adjustment of the knob 143, the switch 132 is operated in the opposite direction by the control lever 133, to advance the other phase, whereupon the control knob 143 is readjusted and a voltage balance is attained.

The thyratron inverter power supply system of the present invention is primarily adapted for supplying two-phase power at frequencies higher than the conventional industrial and mobile power frequencies. These higher frequencies are of value in the operation of high-speed motors, particularly for grinders, which require constant high speed under load. The inverter system of the present invention provides a relatively heavy power output at high frequency and is adapted for variable frequency operation with a high degree of flexibility and stability.

Improved thyratron commutation is provided by reason of the circuit arrangement of the output circuit networks and the adjustable load balancing control included in the phase-shift network following the excitation source. The automatic adjustment of the output voltage for starting a motor load, and the use of power output transformers adapted for efficient operation over a relatively wide frequency range including relatively high power frequencies, further contribute to the improved performance of the present system as a high frequency power supply means for high speed industrial motors and the like.

I claim:

1. A power supply system for high speed industrial motors and the like, comprising a pair of thyratron inverters of the full-wave type, each having a balanced output anode circuit including an output transformer having a center tapped primary winding, a pair of series resistors connected with the terminals of said primary winding in each side of said anode circuit and constituting series arms of a resistance-capacitance network, a capacitor connected across the anode circuit between the junctions of the series connected resistors and constituting a shunt arm of said network, a direct-current power supply circuit for said inverters having a positive supply connection with the center tap of each output transformer primary, a low inductance air-core choke coil in each of said supply connections, a load resistor connected in parallel with each of said choke coils, and means for exciting said inverters at a predetermined high frequency and in predetermined phase relation to each other.

2. A power supply system as defined in claim 1, wherein said excitation means includes a variable phase-shift network having a two-phase excitation voltage output circuit coupled to said thyratron inverters for effecting variable two-phase operation thereof, and wherein the output transformers are provided with a two-phase output connection for balanced load operation under control of said variable phase-shift network.

3. A high frequency power supply system for variable speed industrial motors and the like, comprising in combination, a pair of full-wave thyratron inverters, each inverter including two thyratron tubes having a balanced input grid circuit, adjustable high frequency means connected with each of said grid circuits for exciting said thyratron inverters successively in predetermined time relation for effective two-phase operation, phase-shift means for controlling the phase relation of the excitation between said pairs of thyratron inverters, a balanced anode output circuit for each of said thyratron inverters including two anode leads, a resistance-capacitance control network in each anode output circuit comprising two series resistors in each anode lead and adjustable capacitance means connected across each output circuit between the junctions of the series resistors in the anode leads, a power output transformer for each inverter having a balanced primary connected with the anode leads thereof and an output secondary having a tap switch, and means connecting said excitation means and adjustable capacitance means with the secondary tap switch of each inverter for conjointly adjusting the inverter output voltages and the capacitance of said resistance-capacitance networks with the frequency of said excitation means.

4. A high frequency power supply system as defined in claim 3, wherein the balanced anode circuit for each inverter includes the balanced primary of said power output transformer resonant with the capacitance of the associated control network in a predetermined frequency range.

5. A high frequency thyratron inverter power supply system comprising in combination, a high frequency source of excitation voltage, a phase-shift network coupled to said source for converting said excitation voltage into two corresponding excitation voltages at the same frequency and substantially in two-phase relation to each other, means for selectively advancing the phase of each of said voltages with respect to the other, thereby to shift said two-phase voltage relation, a pair of full-wave thyratron inverters coupled to said phase shift network for receiving the excitation voltages therefrom for effective variable two-phase operation, each of said thyratron inverters having a balanced output anode circuit including an output transformer provided with a center tapped primary winding, a pair of series resistors connected with the terminals of said primary windings in each side of said anode circuits and constituting series arms of two resistance-capacitance networks, capacitor means connected across the anode circuits between the junctions of the series connected resistors and constituting shunt arms for said networks, a direct-current power supply circuit for said inverters having a positive supply connection with the center tap of each output transformer primary, a low inductance air-core choke coil in each of said supply connections, and a load resistor connected in parallel with each of said choke coils.

6. A power supply system as defined in claim 5, wherein said excitation voltage source is adjustable in frequency jointly with the capacity value of the capacitor means across the anode circuit of each inverter, thereby to provide for change in the output frequency of said system.

7. In a high frequency power supply system, a parallel type electronic-tube inverter comprising a pair of push-pull connected inverter tubes, each of said tubes having an output anode, a controlling grid electrode and a cathode, means for applying excitation potentials to said inverter tube grids in push-pull relation, a balanced power output transformer for said inverter having a primary winding provided with a center tap, a resistance-capacitance network connected between said anodes and the power output transformer primary, said network including two series resistance arms between each anode and one terminal of the transformer primary and a shunt capacitance arm connected across the balanced anode circuit between the junctions of said arms on each side of said circuit, a direct current power supply circuit for said inverter tubes connected with the center tap of said primary, and resistance-loaded air-core choke coil means in said supply circuit connection.

8. In a high frequency power supply system, a parallel type electronic-tube inverter comprising a pair of push-pull connected inverter tubes, each of said tubes having an output anode, a controlling grid electrode and a cathode, means for applying excitation potentials at different frequencies to said inverter tube grids in push-pull relation, a balanced power output transformer for said inverter having a primary winding provided with a center tap, a resistance-capacitance network connected between said anodes and the power output transformer primary, said network including two series resistance arms between each anode and one terminal of the transformer primary and a shunt capacitance arm connected across the balanced anode circuit, a direct current power supply circuit for said inverter tubes connected with the center tap of said primary, resistance-loaded air-core choke coil means in said supply circuit connection, said output transformer being provided with a secondary having load-current-controlled tap-changing means for starting a motor load, said shunt capacitance arm of the resistance-capacitance network including a plurality of selectable capacitance elements in the output anode circuit, and selector means for said elements responsive to adjustments in the frequency of the excitation potentials applied to said grids, whereby maximum efficiency of operation is attained at all operating frequencies.

9. In a high frequency power supply system, a pair of full-wave thyratron inverters, means for applying excitation potentials to said inverters in two-phase relation, means for varying the phase relation of said excitation potentials, a balanced output anode circuit for each inverter including a resistance-capacitance network and a balanced output transformer, said network including two series resistance arms in each side of the balanced anode circuit and a shunt capacitance arm connected across said balanced anode circuit between the junctions of said arms on each side thereof, a direct current power supply circuit connected with each of said thyratron inverters, and resistance-loaded air-core choke coil means in the supply circuit connection for each of said inverters.

10. In a high frequency power supply system, the combination as defined in claim 9, wherein the excitation potential applying means is adapted to provide a plurality of differing output frequencies, and the shunt capacitance arm in each of said output anode circuit networks is conjointly adjustable in capacitance value with change in frequency.

11. In a high frequency power supply system, the combination as defined in claim 9, wherein the excitation potential applying means is adapted to provide a plurality of differing output frequencies, and the shunt capacitance arm in each of said output anode circuit networks is conjointly adjustable in capacitance value with change in frequency, and wherein the balanced output transformers are provided with secondary tap-changing means responsive to the output voltage of one inverter for controlling the starting load for high speed motor operation, and additional secondary tap-changing means conjointly adjustable with said excitation potential applying means and the shunt capacitance arm in each of said output anode circuit networks, for maintaining the output voltages of said inverters between predetermined limits with change in frequency.

12. A power supply system for high speed industrial motors and the like, comprising a pair of thyration inverters of the full wave type, each having a balanced output anode circuit including an output transformer having a center tapped primary winding, a pair of control resistors connected in series with the terminals of said primary windings in each side of both anode circuits, control capacitors connected across said anode circuits between the junctions of the series connected resistors therein, a direct current power supply circuit for said inverters having a positive supply connection with the center tap of each output transformer primary winding, a low inductance air-core choke coil in each of said supply connections, a suppressor resistor connected in parallel with each of said choke coils, and means for exciting said inverters at a predetermined high frequency and in predetermined adjustable phase relation to each other.

13. A power supply system as defined in claim 12, wherein the control capacitors provide a resonant L-C circuit with the primary winding of the associated output transformer in each anode circuit having a resonant frequency with secondary loading above the excitation frequency of said inverters, thereby providing rapid quenching of the outgoing thyratron by L-C resonance in advance of the firing of the incoming thyratron in each inverter.

14. A power supply system for high speed industrial motors and the like, comprising a pair of thyratron inverters of the full wave type, each having a balanced output anode circuit including an output transformer having a center-tapped primary winding, a pair of control resistors connected in series with the terminals of said primary windings in each side of both anode circuits, control capacitors connected across said anode circuits between the junctions of the series-connected resistors therein, a direct-current power supply circuit for said inverters having a positive supply connection with the center tap of each output transformer primary winding, a low inductance air-core choke coil in each of said supply connections, a suppressor resistor connected in parallel with each of said choke coils, and means for exciting said inverters at a predetermined high frequency and in predetermined phase relation to each other, said last named means comprising a high frequency excitation voltage source, a phase shift network for deriving therefrom equal excitation voltages for said inverters in said predetermined phase relation, separate channel amplifier and phase inverter means for applying said voltages to said inverters whereby they are operated for full-wave output and in said predetermined relation, and a phase advance circuit connected with said phase shift network for varying the phase relation of said excitation voltages, thereby to effect a balance in the loading of said inverters in connection with a common motor load.

15. A high frequency power supply system for high speed induction motors and the like, comprising in combination, two pairs of hot-cathode gaseous-discharge tubes each having a cathode, an anode and a control electrode, a balanced excitation input circuit connected between the control electrodes of each pair of tubes, a high frequency excitation system for full wave inverter operation of each pair of said tubes adapted to provide two equal excitation potentials in adjustable two-phase relation, amplifier and phase-inverter means connected with said input circuits for applying said two-phase excitation potentials separately to said pairs of tubes and alternately in each pair for full-wave operation, whereby said pairs of tubes operate in two-phase relation to each other in response to said excitation potentials and at a common frequency established by said excitation system, a power output transformer for each pair of said tubes having a primary winding connected in a balanced anode output circuit between the anodes thereof and having a center tap, a pair of series-connected current-controlling resistors interposed in each side of each balanced anode circuit between each anode and the primary winding connection therefor, control capacitors providing resonant L-C circuits with the primary windings connected between the junctions of the series connected resistors of each pair of tubes across the balanced anode circuits, a rectified polyphase power supply circuit connected between the cathodes of said tubes and the center taps of said primary windings for applying direct current power to said pairs of tubes through each half of the respective primary windings, an inductor element in each of the center tap connections for said power supply circuit, said inductor elements each having a relatively low inductance, and a relatively low-resistance peak-voltage limiting resistor connected in shunt with each of said inductor elements, each of said transformers having a power output secondary provided with voltage changing taps and a common two-phase output connection for a motor load circuit.

16. A high frequency power supply system as defined in claim 15, wherein the control capacitors resonate said L-C circuits under load conditions, above the excitation frequency, and wherein the frequency of the excitation system and the values of said control capacitors are conjointly adjustable for effective speed control of a motor load on said common two-phase output connection.

17. A variable speed motor control system for the conversion of rectified direct-current power into alternating current power for motor operation at a variable high frequency comprising in combination, a variable high frequency excitation voltage source provided with a phase shift network for deriving a two-phase excitation voltage therefrom and having means for advancing the phase of either excitation voltage from the network to a predetermined degree to effect a balance in the loading of the system, a full wave thyratron inverter coupled to each phase of said phase shift network for operation at the frequency of the excitation voltage source, each of said inverters including a balanced power output transformer and a balanced anode circuit connected therewith including two series-connected current-controlling resistors in each side of the anode circuit and control capacitance means in shunt across said circuit between the junctions of said resistors, said capacitance means providing an L-C resonant circuit with a winding of the output transformer in each inverter, selector switch means for changing the effective capacity of said control capacitance means and the resonance frequency of said L-C circuits in accordance with changes in the frequency of the excitation voltage source and the resultant speed of a common motor load for said inverters, and high-voltage low inductance air-core inductors providing direct current power supply connections with said inverters through each of said output transformers, said inductors each having a peak voltage limiting resistance load means in shunt therewith.

18. A variable speed motor control system as defined in claim 17, wherein the motor load is a high speed two-phase induction motor, and wherein secondary current connections with the transformer are selectively adjustable in unison with the excitation frequency adjustment and capacitance change, for controlling the load voltage developed by said inverters at different frequencies.

19. A variable speed motor control system as defined in claim 17, wherein the power output transformers have a relatively large core cross section and a relatively small winding space adapted to carry relatively high peak values of magnetic flux which occurs during each cycle of the operating frequency by reason of the complex wave form of the voltages developed by the thyratron commutation across said transformer windings, and wherein the air-core inductors are provided by air-core choke coils each having an inductance of the order of 1.5 millihenry and providing a relatively high degree of insulation between the winding turns thereof for relatively high voltage operation.

20. A high frequency thyratron inverter power supply system comprising in combination, a high frequency source of excitation voltage, a phase shift network coupled to said source for converting said excitation voltage into two corresponding excitation voltages at the same frequency and substantially in two-phase relation to each other, means for selectively advancing the phase of each of said voltages with respect to the other, thereby to shift the two-phase voltage relation in different directions to predetermined degrees, a pair of full-wave thyratron inverters coupled to said phase shift network for receiving the excitation voltages therefrom for effective two-phase operation, each of said thyratron inverters having a balanced output anode circuit including an output transformer provided with a center tapped primary winding connected therein, a pair of series connected resistors interposed in circuit with the output transformer primary on each side thereof, a series of capacitors selectively connectable across each of said balanced anode circuits between the junctions of the series connected resistors in each side thereof in response to frequency adjustment of said excitation voltage source, a direct current power supply circuit for said inverters having a positive supply connection with the center tap on the primary windings of each of said output transformers, a low inductance air-core choke coil included serially in each of said last named connections adjacent to said center taps, and a peak voltage limiting resistor connected in shunt with each of said choke coils.

21. A high frequency power supply system as defined in claim 20, wherein the output transformers are provided with secondaries having tap-changing means responsive to the output voltage of one secondary for controlling the starting load on said thyratron inverters, and wherein a phase shift control circuit is provided in connection with said phase shift network for effecting a change in the phase relation of said excitation voltages and a balance in the output load on said thyratron inverters.

22. A high frequency power supply system for variable speed industrial motors and the like, comprising in combination, a pair of full-wave thyratron inverters, high frequency means for exciting said thyratron inverters in predetermined phase relation, phase shift means for controlling the phase relation of the excitation between said pair of thyratron inverters, a balanced anode output circuit for each of said thyratron inverters including two anode output circuit leads, an output transformer having a center-tapped primary winding connected between said leads for each inverter, a pair of series-connected current-controlling resistors in each of said anode output circuit leads, a plurality of control capacitors for tuning each anode output circuit, selector switch means in each anode output circuit for connecting said capacitors successively across said anode circuits between the junctions of said resistors therein to vary said tuning, a direct-current power supply connection with the center taps on each of said output transformer primaries, and a resistance-loaded low-inductance air-core choke coil in each of said last named connections.

23. A high frequency power supply system for variable speed industrial motors and the like, comprising in combination, a pair of full-wave thyratron inverters, adjustable high frequency means for exciting said thyratron inverters in predetermined phase relation for effective two-phase operation, phase-shift means for controlling the phase relation of the excitation between said pair of thyratron inverters, a balanced anode output circuit for each of said thyratron inverters including two anode output circuit leads, an output transformer having a center-tapped primary winding connected between said leads for each inverter, a pair of series-connected current-controlling resistors in each of said anode output circuit leads, said resistors constituting the series arms of a resistance-capacitance control network in each anode output circuit, a plurality of control capacitors for each anode output circuit, selector switch means in each anode output circuit for connecting said capacitors successively across said anode circuits between the junctions of said resistors therein, thereby to provide adjustable shunt arms for the resistance-capacitance control network in each of said anode output circuits, a direct current power supply connection with the center tap on each of said output transformer primaries, a resistance-loaded low-inductance air-core choke coil in each of said last named connections, a high speed two-phase motor coupled to said inverters through said output transformers, and means for conjointly adjusting the operating voltage applied to said motor from said transformers and the frequency of said excitation means.

24. A high frequency power supply system for variable speed industrial motors and the like, comprising in combination, a ventilated casing divided into three vertically alined compartments, said casing having a panel front and a rigid supporting frame structure, a pair of full wave thyratron inverters and a pair of power output transformers therefor mounted in the center compartment, said transformers having relatively heavy laminated audio-iron cores and winding windows of relatively small size, high frequency means for exciting said thyratron inverters in predetermined phase relation mounted in a frontal portion of the top compartment, means providing a balanced anode output circuit for each of said thyratron inverters including two anode output circuit leads and the primary of one of said output transformers, a pair of series-connected current-controlling resistors in each of said anode output circuit leads mounted in spaced parallel relation to each other in a rearward portion of the top compartment of said casing, selector switch means for controlling each anode output circuit and the output voltage from each output transformer conjointly with said high frequency excitation means having a control element on said panel, a direct current power supply system including a power transformer and a plurality of full-wave rectifier electronic-tube elements mounted in the bottom compartment of said casing, a resistance loaded air-core choke coil interposed in circuit between the direct current power supply system and each of said inverters through a center tap connection on the output transformer primaries, said choke coils being mounted in the center compartment of said casing between said output transformers, frequency control means for the high frequency excitation means mounted on said panel for operation from the front thereof, and means providing plug-in power input and output connections for said system mounted on said casing for receiving cable terminal plugs for power supply and load connections with said system.

GALAN W. DEMUTH.

REFERENCES CITED

The following references are of record in the file of this patent:

UNITED STATES PATENTS

| Number | Name | Date |
| --- | --- | --- |
| 2,305,581 | Homrighous | Dec. 15, 1942 |
| 2,335,874 | Moyer et al. | Dec. 7, 1943 |
| 2,500,314 | Jacobson | Mar. 14, 1950 |